United States Patent [19]
Holder

[11] 3,800,460
[45] Apr. 2, 1974

[54] FISHING FLOAT DEVICE

[75] Inventor: James H. Holder, St. Paul, Minn.

[73] Assignee: Raymond D. Perry, St. Paul, Minn.; a part interest

[22] Filed: July 7, 1972

[21] Appl. No.: 269,791

[52] U.S. Cl. .............................. 43/44.9, 43/44.91
[51] Int. Cl. ........................................... A01k 91/00
[58] Field of Search............... 43/44.88, 44.9, 44.91

[56] References Cited
UNITED STATES PATENTS

| | | | |
|---|---|---|---|
| 2,984,040 | 5/1961 | Fogaley | 43/44.91 X |
| 3,097,373 | 7/1963 | Wisti | 43/44.9 X |
| 3,577,669 | 5/1971 | Johnson | 43/44.91 X |

*Primary Examiner*—Louis G. Mancene
*Assistant Examiner*—Robert F. Cutting
*Attorney, Agent, or Firm*—Williamson, Bains & Moore

[57] ABSTRACT

A fishing float or bobber device castable with a fishing rod, the device including a case with flotation chambers, a pair of cooperating drums to engage fishing line passing through the case, and a gear train rotatably coupled to one of the drums to receive rotational energy from the drum in response to fishing line moving past and rotating the drum. The bobber is connected to a fishing line at a first position located a predetermined distance above the leader, and as a fisherman reels in the line and the bobber contacts the end of the fishing rod, the line continues to move through the bobber, rotating the drums and turning the gear train which winds a spring from an initial condition to a spring loaded condition. When the fisherman casts the bobber into the body of water, the spring loaded gear train unwinds, returning to the initial condition and transmitting rotational energy back to the drums to produce relative movement between case and line to return the bobber to its first position, resulting in the fisherman being able to repeatedly cast the bobber and line to a desired section of lake and insure that his bait is the predetermined distance below the surface of the water.

10 Claims, 8 Drawing Figures

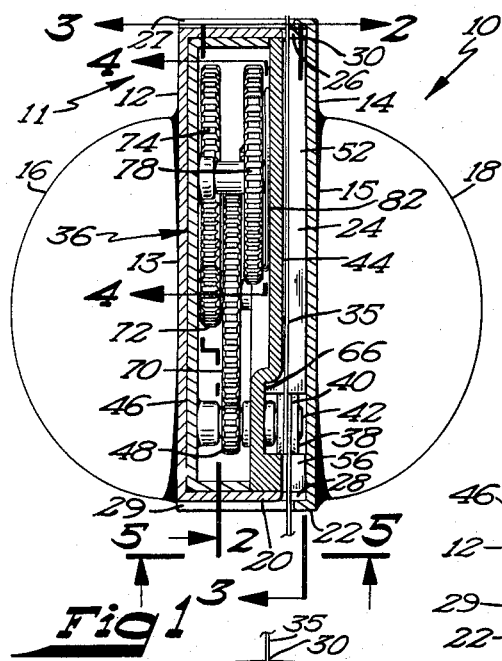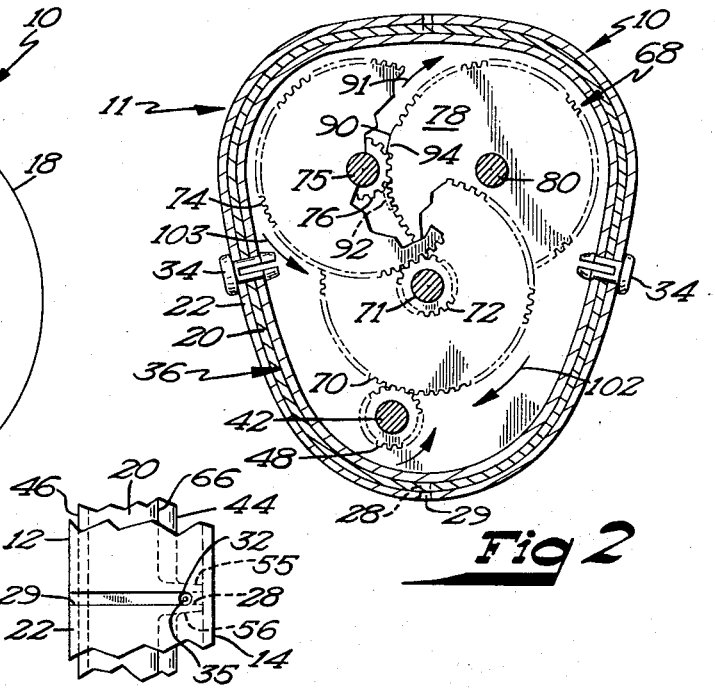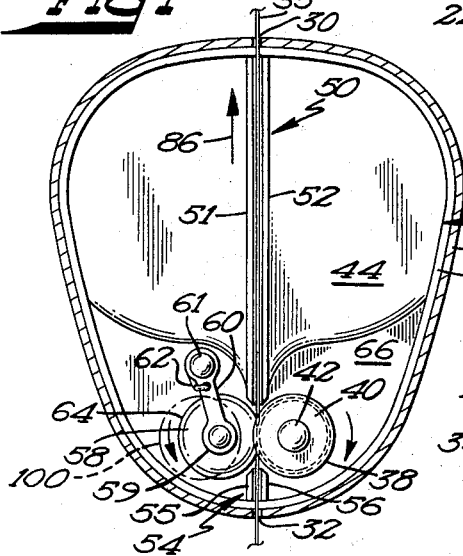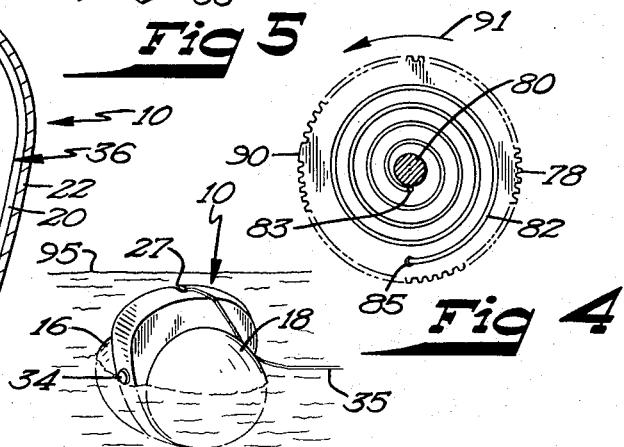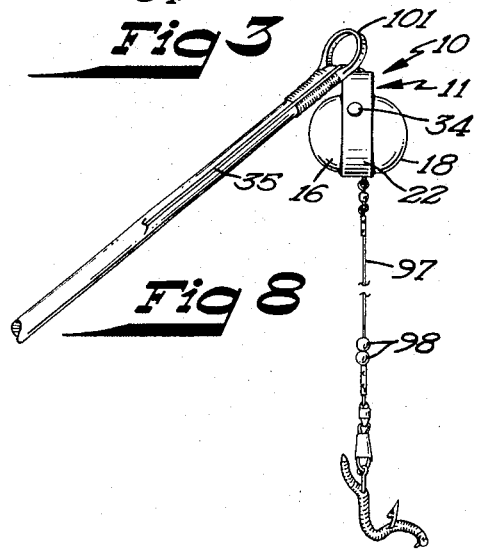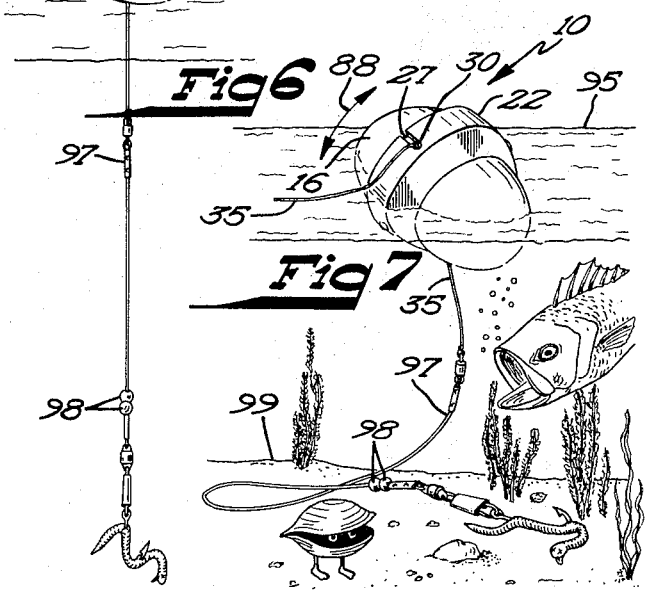

FISHING FLOAT DEVICE

BACKGROUND OF THE INVENTION

Most commercially available float or bobber devices are designed to be attached to the fishing line at a given point and remain there unless manually moved along the line by the fisherman. Such a bobber functions effectively when the bait is a relatively short distance from the bobber, such as five to six feet, or when still fishing, as opposed to casting, is practiced.

When it is desired to keep one's bait ten to twenty feet below the bobber so as to reach fish in deeper waters, the described commercially available bobbers have serious shortcomings. Often it is necessary to cast one's line a considerable distance to reach a desired fishing location. Because commercially available bobbers prevent the fisherman from winding in his line past the point at which the bobber is attached, he is left with a 10 to 20 foot line extending beyond his rod tip between bobber and bait. If this section of line were to be cast it would lash and swirl about the fisherman, often snagging nearby objects such as boats, ropes, trees, and other fishermen. Considerable injuries have resulted from the uncontrollable and unpredictable behavior of long sections of fishing line extending between bobber and bait. Because of the dangers associated with the described situation, few fishermen attempt casting a line having a lengthy segment between bobber and bait, and as a consequence they are for practical purposes prevented from casting and then fishing at a ten to twenty foot depth beneath the surface.

Attaching a commercially available bobber ten or more feet from the bait produces an additional problem when a fish is hooked because the fisherman is unable to reel in the line after the bobber encounters the rod tip. As a consequence, the remainder of the line must be manipulated by hand with the accompanying inconvenience and obvious hazard of losing the hooked fish.

Still another problem encountered with the commercially available bobbers is that many have wires or springs on or around the bobber which easily catch or snag on the rod tip, making it difficult to unwind or cast the line.

The below described invention provides an excellent solution to the described problems and greatly expands the scope of casting activity which a fisherman may practice.

BRIEF SUMMARY OF THE INVENTION

The invention relates to the field of fishing float devices or bobbers and comprises a bobber removably mounted on a fishing line and when mounted permits relative movement between line and bobber. The fisherman attaches the bobber to the line at a predetermined distance from the bait, the distance being equal to the depth at which he desires the bait to be suspended beneath the surface of the water. The fisherman then winds in the fishing line, and when the bobber encounters the rod tip, continues to wind in the line. The fishing line, in passing through the bobber case, rotates a fishing line engaging mechanism therein which is coupled with sensing means within the case for sensing the amount of rotation of the line engaging mechanism. The sensing means includes a spring, and as the line engaging mechanism rotates, the spring is wound to generate a restoring torque whose purpose will be described hereafter. The fisherman continues to reel in line until the bait and leader are adjacent the bobber near the rod tip. The fisherman then casts the bobber, bait and line in conventional fashion, the bobber providing a useful weight to provide additional inertia and casting distance. As the bobber is cast from the rod, the described restoring torque produces reverse rotation of the line-engaging mechanism, causing the bobber to be urged along the fishing line toward the rod, the magnitude of the restoring torque being adequate to return the bobber to the position on the fishing line at which the fisherman originally placed it. Accordingly, the bobber invention assures that the bait is positioned at the predetermined desired distance beneath the water surface for optimum fishing even when the bobber is a considerable distance from the fisherman. Because the bobber invention is constructed to permit reeling in of the fishing line until the leader is adjacent the bobber and rod tip, the bobber provides no impediment to the reeling in and capture of a hooked fish.

The invention provides a simple and reliable mechanism which eliminates the former danger of long sections of swirling, unpredictable line between bobber and bait during the casting operation. It permits a fisherman to cast from shore or boat in complete safety while assuring that the bait will be placed at the precise distance beneath the water surface desired by the fisherman. Because the bobber moves freely relative to the line, it presents no obstacle when landing a fish. It has a smooth, symmetrical exterior which eliminates any fouling problems with rod tip. In addition, it is constructed and arranged to indicate whether one's bait is resting on the bottom or suspended thereabove.

The invention is adaptable to river, lake, or ocean-type fishing and may be attached at virtually any desired distance from the leader, permitting the fisherman to set the bobber to retain the bait at any desired fishing depth. The device is mechanically simple and economical to manufacture while being extremely durable and rugged to assure long term, dependable operation.

BRIEF DESCRIPTION OF THE DRAWINGS

FIG. 1 is a front sectional view of the bobber invention;

FIG. 2 is a sectional side view of the invention of FIG. 1 taken along cutting plane 2—2 of FIG. 1;

FIG. 3 is a sectional side view taken along cutting plane 3—3 of FIG. 1;

FIG. 4 is a side view of a gear wheel taken along cutting plane 4—4 of FIG. 1;

FIG. 5 is a bottom view of a portion of the bobber taken along cutting plane 5—5 of FIG. 1;

FIG. 6 is a perspective view of the bobber invention in normal operation with the bait suspended above the lake bottom;

FIG. 7 is a perspective view of the invention wherein the bait is resting on the lake bottom; and FIG. 8 is a perspective view of the invention showing the bobber adjacent the rod tip prior to casting.

DETAILED DESCRIPTION

Referring now to FIG. 1, the fishing float device or bobber 10 has a case 11 formed by mating case halves 12 and 14 which are provided with buoyant flotation chambers 16 and 18, respectively to maintain the bobber on the surface of the water. Contacting case halves 12 and 14 are provided with lips 20 and 22, respectively, the lip 20 being constructed and arranged to be mateably and releasably received within the lip 22 when the case halves are assembled as shown in FIG. 1. Each lip is essentially continuous except for a pair of slots described hereafter and extends entirely about its associated case half as indicated in FIGS. 2 and 3. Inner walls 13 and 15 of buoyant chambers 16 and 18, respectively, and lip 20 define the case interior 24. Typically the case halves 12 and 14 may be formed of a plastic like material, although other light weight but sturdy and water impervious material, inter alia, aluminum, can be used if desired. Although only a single structural arrangement is shown for the case 11, it should be understood that other alternative structures accomplishing the objectives of the shown case are within the purview of the invention.

Case halves 12 and 14 have entrance slots 26 and 27, respectively, the slots arranged on the case lips to meet and overlap in part to form an entrance 30 when the case halves are assembled as shown in FIGS. 1 and 5. Similarly, case halves 12 and 14 also are provided with exit slots 28 and 29, respectively, (FIG. 1), also located on the lips 20 and 22 of the case halves and arranged to form an exit 32 when the slots 28 and 29 meet and overlap in the manner already illustrated for the entrance 30 in FIG. 5.

The described combination of slots permits a fisherman to easily separate the case halves from one another and drop the fishing line 35 in entrance slot 26 and exit slot 28 of case half 12, these slots of lip 20 temporarily retaining the fishing line 35 while the lip 22 of second case half 14 is positioned about lip 20 and the entrance slots and exits slots aligned to define the entrance 30 and exit 32 which then confine the line 35. After the case halves 12 and 14 are assembled as shown in FIG. 1, a pair of connectors 34 (FIG. 2) are inserted through bores in the lips 20 and 22, the connectors preventing the case halves 12 and 14 from separating. These connectors provide a means for selectively retaining the case halves in mating relationship. These connectors are illustrative of one structure capable of retaining the case halves, and other equivalent or alternative structures could as readily have been utilized, such alternative or equivalent structures being within the purview of the invention.

The case interior 24 is constructed and arranged to receive an easily insertable mechanical unit 36, the unit 36 fitting closely within the case interior 24. The unit 36 is ordinarily permanently affixed to the interior wall 13 of case half 12 by any means known to the art, including heat bonding or gluing.

The mechanical unit 36 is provided with a first rotatably mounted drum 38 provided with a grooved rim 40 about its circumference, the grooved rim being provided with a friction generating surface to insure a firm grip between rim and fishing line. The drum 38 has its peripheral groove wide enough to permit fishing line 35 to rest therein and encircle the drum rim, thereby permitting the frictional surface of the grooved rim to firmly engage the fishing line 35 and to rotate with the fishing line. The drum 38 is fixed to shaft 42 which is rotatably mounted between walls 44 and 46 of the mechanical unit 36, raised bosses being provided on both sides of wall 44 and on the interior side of wall 46 to support and rotatably retain the shaft 42. A small spur gear 48 is fixed to the shaft 42 to rotate therewith, the gear being within the mechanical unit 36 between walls 44 and 46 and having a purpose to be described hereafter.

A second drum 58 is rotatably mounted to the end 59 of arm 60. The arm 60 is pivotally mounted to the wall 44 at pin 61 for movement toward and away from drum 38, a spring 62 being coiled about the pin 61 with its ends fixed to wall 44 and arm 60 to urge the arm 60 and drum 58 against grooved drum 38. The drum 58 has a tongue 64 about its rim, the tongue being received by the drum 38 in the grooved rim 40 and cooperating with the first drum 38 by exerting a spring generated force upon the fishing line wrapped about drum 38 to retain the fishing line 35 against the drum 38 while the drums 38 and 58 rotate. It has been found helpful to form the wall 44 of mechanical unit 36 with an indentation 66 to effectively reduce the overall thickness of the mechanical unit 36 and thereby permit the bobber 10 to be of a lesser thickness than would otherwise be possible.

The first drum 38, its rotatably mounted shaft 42, the second drum 58, its pivotally mounted arm 60, and spring 62 collectively form a fishing line engaging mechanism to engage the fishing line 35 and which permits relative movement between the case 11 and the fishing line. Although it has been found desirable to include the pivotally mounted arm 60, spring 62, and drum 58, these are not essential and the line engaging mechanism functions effectively without them. The spring 62 serves as a retaining means to selectively urge the tongue 64 of the second drum 58 into the grooved rim 40 of the first drum 38 to inhibit the fishing line 35 leaving the groove of the first drum.

Referring now to FIG. 3, entrance guide 50 has raised barriers 51 and 52 spaced from each other and extending from the wall 44 of unit 36 toward wall 15 of case half 14, the barriers terminating at the wall 15 but not attached to the wall 15 in order that the case halves may be separated easily. The barriers 51 and 52 define a channel therebetween along which the fishing line 35 is confined and directed from the entrance 30 to the grooved rim 40 of drum 38. A similarly constructed exit guide 54 extends from wall 44 up to wall 15 and is positioned adjacent the exit 32 and has a channel defined by barriers 55 and 56, the channel being of a size to confine and direct fishing line 35 from the drum 38 to the exit 32.

Inside the mechanical unit 36 is a reduction-type gear train 68 (FIGS. 1 and 2). Spur gear 48 of the gear train is fixed to shaft 42 of the line engaging mechanism and in turn drives spur gear 70, which is rotatably mounted between the side walls of the mechanical system 36 on shaft 71. Spur gear 70 has a smaller spur gear 72 attached thereto and coaxial therewith on shaft 71, the spur gear 72 meshing with and engaging a larger spur gear 74 rotatably mounted on shaft 75. The gear 74 has a smaller spur gear 76 attached to shaft 75 and coaxial therewith on shaft 75 to rotate with gear 74. Spur gear 78 is rotatably mounted on shaft 80 and engages smaller spur gear 76. The spur gear 78 has a portion 90 of its periphery without teeth in order to prevent its rotation beyond a given arc defined by the section of the gear on which teeth are formed. (FIGS. 2 and 4).

A coil spring 82 is coiled about the shaft 80, one end 83 of the spring being inserted in a bore in the wall 44 of unit 36. The opposite end 85 of the coil spring is inserted in a bore in the spur gear 78. The gear 78 is rotatable through an arc between starting point 94 where stop 90 prevents further movement of gear 78 toward gear 76 and a terminal point 92 where stop 90 again contacts gear 76 and has moved forward through an arc in direction 91. When stop 90 is in position 92 the spring 82 is fully loaded to turn the gear rearwardly and move stop 90 back to position 94. It has been found helpful to arrange the spring 82 so that it is loaded to exert a torque on gear 78 even when stop 90 is in position 94. The spring torque acts to move the gear 78 from position 92 to position 94 as the spring unwinds from a loaded condition to an initial condition.

The gears 48, 70, 72, 74, 76, and 78 and spring 82, all properly mounted in the casing of the mechanical unit 36 collectively comprise a means for sensing the amount of rotation of the line engaging mechanism caused by fishing line moving past the line engaging mechanism, the recited elements also generate and transmit a restoring torque to the line engaging mechanism to produce relative movement between the case 11 and the line 35. It should be understood that the shown elements are illustrative of but one structure adequate to sense the amount of rotation and generate a restoring torque and that other alternative systems obvious to one skilled in the art are within the purview of the invention. As the line is reeled in in the direction of arrow 86 (FIG. 3) the gear train rotates such that the final gear 78 moves in direction 91, causing the spring 82 to be wound from initial to loaded condition. It is not essential to have the stop 90 on gear 78, but it is helpful since the stop assures that the spring is never overwound to its breaking point.

The gear train 68 is positioned high in the mechanical unit 36 in order to raise the center of gravity of the bobber 10 above the water line 95 when the unit 36 is installed in the case 11 for a purpose now to be described. When the bobber 10 rests on the water surface 95 as shown in FIG. 6 with the leader 97 and sinker 98 suspended downwardly, the sinker 98 exerts a downward force adequate to insure that the bobber 10 floats in the position shown in FIGS. 3 and 6 with the fishing line 35 passing therethrough along guides 54 and 50 in a substantially upright orientation. When the sinker 98 rests on the bottom 99 of the body of water as shown in FIG. 7 no downward force is exerted on the bobber 10 by the sinker and the high center of gravity established by the positioning of the gear train 68 causes the bobber 10 to roll in directions 88 (FIG. 7), and assume a tipped position on the surface 95 of the water and readily detectable by the fisherman, indicating that he is fishing in water too shallow for the length of line 35 extending below the bobber and that he should adjust the bobber's position on the line.

It has been found desirable that the gear train 68 selected for use with the invention 10 should permit ten to twenty feet of fishing line to pass through the line engaging mechanism before the final gear 78 rotates through its arc from position 94 to position 92. As will be apparent to those skilled in the art, various gear trains are available to accomplish this objective and all such gear trains are within the purview of the invention. Although the shown embodiment is intended for operation at depths of approximately 15 to 20 feet below the surface 95 the gear train 68 can be varied to permit the distance between bobber and leader to be greater.

In operation, the fisherman first determines the depth at which he would like his bait to be suspended beneath the water surface 95. For purposes of illustration presume this depth is 15 feet. The fisherman manually extracts connectors 34 from the lips of the case halves 12 and 14, thereby permitting the case halves to be pulled apart exposing the drums 38 and 58.

The fisherman then measures fifteen feet from the bait upward along the fishing line 35, and attaches the line 35 to the line engaging mechanism at a first position at the fifteen foot location in the following manner. With one hand the fisherman swings the second drum 58 and arm 60 about pivot pin 61 away from first drum 38 to position 100. If the fishing line 35 is a heavy fibrous line it is ordinarily adequate if the line simply rests within the grooved rim 40 of drum 38 without actually passing entirely about and encircling the drum 40. With most thin monofilament lines it has been found desirable that the monofilament line encircle the rim 40 of drum 38.

The fisherman places the line 35 in the entrance slot 26 and along the channel of entrance guide 50. As the line leaves the entrance guide adjacent the drum 38, the fishing line (if monofilament) is wound about the drum 38 within the groove 40 and then the drum 58 released and permitted to bear against the fishing line in the groove 40 to aid in retaining the line in the groove. The friction generating surface on the rim of drum 38 aids in retaining the line thereon. Line leaving the drum 38 passes along the channel of exit guide 54 and out exit slot 28 leading eventually to the sinker 98 and leader 97 some 15 feet away as shown in FIG. 3. The line leaving the entrance slot 26 goes directly to the rod tip 101. The second case half 14 is now placed in mating relationship with case half 12, the lips 20 and 22 fitting snugly together and retained together by connectors 34 which are reinserted through the lips on opposite sides of the case 11.

Before casting, the fisherman winds in his line until the bobber encounters the rod tip 101 and then continues to reel in line. Because the bobber 10 rests against the rod tip, it can move no further, and the line 35 then moves through the bobber and thence to the fishing reel. Due to this reeling, the bobber moves from the first position on the fishing line where it was initially placed to a second position on the line where it either contacts the rod tip 101 or, alternatively, stop 90 is in fully wound position 92. As the fishing line moves through the bobber in direction 86 (FIG. 3), it rotates drums 38 and 58 in the directions of the shown arrows.

As drum 38 is rotated by the moving fishing line 35, the shaft 42 on which it is mounted rotates with it and attached spur gear 48 moves at the same angular velocity as drum 38. Spur gear 48, in turn, rotates larger spur gear 70 in direction 102 at a slower angular velocity. Spur gear 72 attached to gear 70 rotates with gear 70 and in turn rotates spur gear 74 in direction 103 at a still lower angular velocity. Spur gear 76 which is attached to gear 74 meshes with gear 78 and rotates gear 78 in direction 91. Before rotation of gear 78 began, it was held in an initial position wherein stop 90 was in position 94 contacting spur gear 76 and stop 90 was retained there by spring torque generated by coil spring 82. As the gear train 68 is rotated by fishing line passing drum 38, gear 78 continues to turn in the indicated direction of arrow 91. As gear 78 turns, the restoring spring torque of spring 82 steadily increases; gear 78 continues to rotate in direction 91 until either the sinker 98 contacts exit 32 and can move no further through the bobber, or alternatively until stop 90 makes a near complete rotation to position 92 and rests against spur gear 76. It has been found satisfactory if the stop 90 reaches position 92 when approximately 15 to 20 feet of line have passed through the bobber. It is desireable to position the bobber a distance above the sinker which is less than the capacity of the gear train so that sinker 98 reaches exit 32 no later than stop 90 reaches position 92.

The fisherman now casts the bobber 10 from the rod in conventional fashion, and as soon as the rod tip no longer contacts the bobber, the spring torque stored in spring 82 begins to turn gear 78 in a reverse direction opposite to the arrow 91. This rotation in turn rotates spur gear 76 and attached gear 74 in a direction opposite to arrow 103. Rotation of gear 74 rotates spur gear 72 which in turn rotates attached gear 70 in a direction opposite to arrow 102 and turns spur gear 48 which is coaxial with drum 38. Consequently drum 38 begins to rotate in the direction opposite the arrow shown in FIG. 3, and this rotation of drum 38 pulls the fishing line 35 and moves it along entrance guide 50 and exit guide 54 and out of the bobber through exit 28. Consequently the bobber pulls itself along the fishing line 35, moving away from the leader 97 and toward the rod tip 101. This relative movement between bobber and line continues until the bobber has reached the original first position on the line spaced fifteen feet from the bait. When the bobber has reached this first position, the gear 78 has been rotated by spring 82 back to its initial position where the stop 90 is in position 94.

Provided that the bait and sinker are not resting on the bottom 99 of the body of water, they exert a downward force on the bobber 10, retaining the bobber in the shown upright orientation of FIG. 6. In the event that the bait and sinker are resting on the bottom, there is no downward force acting on the bobber and accordingly, the bobber rolls to an inclined position (FIG. 7) which is readily detectable by the fisherman. This rolling occurs because the gear train 68 is mounted high within the mechanical unit 36 and produces tipping if not counterbalanced by the downwardly applied force generated by bait and sinker.

If the fisherman decides it is advantageous to fish at a depth other than the initial 15 feet setting, he need only remove the connectors 34 and separate case halves 12 and 14. He then swings the pivotally mounted arm 60 and attached drum 58 away from drum 38 and moves the bobber upward or downward along the fishing line 35 to the preferred position. He then releases the pivotally mounted arm 60 which again causes drum 58 to bear against the line encircling drum 38 and then reassembles the case halves inserting the connectors. Because the bobber 10 permits the line 35 to be wound onto the reel until the sinker 98 reaches the bobber exit 32, the problems and dangers associated with casting a long segment of line is eliminated.

When a fish is hooked, the fisherman reels in his line until the sinker 98 encounters the bobber and then easily nets the fish. The invention eliminates the problem of being unable to wind in one's line further after the bobber strikes the rod tip and still having a long line segment extending into the water and being forced to capture the fish by manually manipulating the remaining line between bobber and leader.

While the preferred embodiments of the present invention have been described, it should be understood that various changes, adaptations and modifications may be made therein without departing from the spirit of the invention and the scope of the appended claims.

What is claimed is:

1. A fishing float device usable with a fishing rod and movable along a fishing line between first and second positions on the line comprising:
   a case, including flotation means to retain the case at the surface of a body of water;
   a fishing line engaging mechanism mounted within said case and engageable on the line at the first position thereon, said mechanism permitting relative movement between said case and the line and being rotated by such relative movement; and
   means for sensing the amount of rotation of said line engaging mechanism produced by the fishing line moving past said fishing line engaging mechanism during relative movement between said case and the line from the first position to the second position on the line and in response to such rotation of the line engaging mechanism, the sensing means generating a restoring torque rotating said line engaging mechanism to produce relative movement between said case and line so as to return the case from the second position to the first position on the line.

2. The fishing float device of claim 1 wherein said fishing line engaging mechanism includes a first rotatably mounted drum provided with a grooved rim about its circumference for receiving the fishing line and a second rotatably mounted drum having a tongue about its circumference arranged to be received by said grooved rim and bear against the line therein, cooperating with said first drum and rotating therewith as the line moves between said first and second drums.

3. The fishing float device of claim 3 wherein said second drum is mounted for movement toward and away from said first drum to permit the line to be selectively inserted and removed from said grooved rim of said first drum so that the line engaging mechanism can be engaged and disengaged with the line at selected locations therealong.

4. The fishing float device of claim 3 wherein said line engaging mechanism further includes retaining means to selectively urge said tongue of said second drum into the groove of said first drum to inhibit the fishing line leaving the groove of said first drum.

5. The fishing float device of claim 1 wherein said sensing and generating means includes a gear train and a spring, the gear train having its input rotatably coupled to said line engaging mechanism, the gear train arranged to deform said spring from an initial condition to a second spring-loaded condition as said line engaging mechanism is related by line moving past said line engaging mechanism during relative movement of the case from first position to second position, said spring when in second condition actuating the gear train to generate and transmit motion from the spring and through the gear train to rotate the line engaging mechanism to produce relative movement between case and line to restore the case to the first position on the line while the spring returns to initial condition.

6. The fishing float device of claim 5 and further including a stop arranged to cooperate with said gear train to prevent additional movement of said train in a given direction after a predetermined amount of rotation of said line engaging mechanism.

7. The fishing float device of claim 5 wherein said spring is in a loaded, stressed state when in said initial condition.

8. The fishing float device of claim 1 wherein said case has an entrance and exit for fishing line and said sensing and generating means is positioned in said case to establish the center of gravity of the device a predetermined distance above the surface of the water level in order that the device will roll over when resting on the surface of the water unless a downward force of predetermined magnitude is applied to fishing line suspended downwardly from the exit to thereby stabilize the device and align the axis extending between entrance and exit in a generally upright direction.

9. A fishing float device usable with a fishing rod and movable along a fishing line between first and second positions on the line comprising:

a case, including flotation means to retain the case at the surface of a body of water, the case further including selectively separable case halves which cooperate to define a hollow interior within the assembled case;

a mechanical unit constructed and arranged to be received within said hollow interior of said case, the said mechanical unit including a fishing line engaging mechanism mounted to said mechanical unit and engagable the fishing line at the first position thereon, said line engaging mechanism permitting relative movement between said case and the line and being rotated by such relative movement; and said mechanical unit further including means for sensing the amount of rotation of said line engaging mechanism produced by the fishing line moving past said fishing line engaging mechanism during relative movement between said mechanical unit and the line from the first position to the second position on the line and in response to said rotation of the line engaging mechanism, the sensing means generating a restoring torque producing relative movement between said mechanical unit and line so as to return the case from the second position to the first position on the line.

10. The fishing float device of claim 1 wherein said case includes selectively separable case halves, each half provided with a fishing line entrance slot and exit slot, the entrance slots of said halves aligning to form an entrance in the case and the exit slots an exit in the case when the halves and placed in contacting relationship and further including an exit guide within the case and extending from said exit substantially to said line engaging mechanism to direct line between the said line engaging mechanism and said exit, the case halves being positionable about the line to contain the line therebetween when placed in contacting relationship, and said case further including means to selectively retain the case halves in mating relationship.

* * * * *

UNITED STATES PATENT OFFICE
CERTIFICATE OF CORRECTION

Patent No. 3,800,460   Dated April 2, 1974

Inventor(s) James H. Holder

It is certified that error appears in the above-identified patent and that said Letters Patent are hereby corrected as shown below:

Column 8, line 41, Delete "claim 3" and substitute --claim 2--.

Column 10, line 22, Delete "and" and substitute --are--.

Signed and sealed this 26th day of November 1974.

(SEAL)
Attest:

McCOY M. GIBSON JR.
Attesting Officer

C. MARSHALL DANN
Commissioner of Patents